(12) United States Patent
Xu et al.

(10) Patent No.: US 11,477,591 B2
(45) Date of Patent: Oct. 18, 2022

(54) AUDIO DATA PROCESSING METHOD, TERMINAL DEVICE, AND STORAGE MEDIUM

(71) Applicant: HONOR DEVICE CO., LTD., Guangdong (CN)

(72) Inventors: Qian Xu, Nanjing (CN); Jie Li, Nanjing (CN)

(73) Assignee: Honor Device Co., Ltd., Shenzhen (CN)

( * ) Notice: Subject to any disclaimer, the term of this patent is extended or adjusted under 35 U.S.C. 154(b) by 514 days.

(21) Appl. No.: 16/328,507

(22) PCT Filed: Aug. 26, 2016

(86) PCT No.: PCT/CN2016/097026
§ 371 (c)(1),
(2) Date: Feb. 26, 2019

(87) PCT Pub. No.: WO2018/035873
PCT Pub. Date: Mar. 1, 2018

(65) Prior Publication Data
US 2021/0281963 A1    Sep. 9, 2021

(51) Int. Cl.
*H04S 1/00*    (2006.01)
(52) U.S. Cl.
CPC ....................... *H04S 1/00* (2013.01)
(58) Field of Classification Search
CPC .......... H04S 1/00; H04S 1/005; H04R 1/1041
See application file for complete search history.

(56) References Cited

U.S. PATENT DOCUMENTS

| | | | |
|---|---|---|---|
| 6,449,359 B1 | 9/2002 | Luzzatto et al. | |
| 2006/0045304 A1 | 3/2006 | Lee et al. | |
| 2010/0020998 A1* | 1/2010 | Brown | H04R 1/1041 381/380 |
| 2011/0022204 A1 | 1/2011 | Hatfield | |
| 2013/0185639 A1* | 7/2013 | Lim | H04R 5/04 715/727 |

(Continued)

FOREIGN PATENT DOCUMENTS

| | | |
|---|---|---|
| CN | 1926610 A | 3/2007 |
| CN | 101459717 A | 6/2009 |

(Continued)

OTHER PUBLICATIONS

PCT International Search Report and Written Opinion issued in International Application No. PCT/CN2016/097026 dated May 16, 2017, 19 pages (with English translation).

(Continued)

*Primary Examiner* — Jason R Kurr
(74) *Attorney, Agent, or Firm* — Fish & Richardson P.C.

(57) ABSTRACT

The present disclosure relates to audio data processing methods and devices. One example method includes obtaining a first audio data and a second audio data, converting the first audio data into a first channel of audio data and converting the second audio data into a second channel of audio data, and at least one of outputting the first channel of audio data to a first audio output device or outputting the second channel of audio data to a second audio output device.

20 Claims, 11 Drawing Sheets

(56) References Cited

U.S. PATENT DOCUMENTS

| | | | |
|---|---|---|---|
| 2016/0029139 A1* | 1/2016 | Lee .................. | G10L 19/008 381/17 |
| 2016/0205459 A1 | 7/2016 | Kamada et al. | |
| 2018/0279038 A1* | 9/2018 | Boesen ............... | H04R 1/1016 |

FOREIGN PATENT DOCUMENTS

| | | | |
|---|---|---|---|
| CN | 102568513 | A | 7/2012 |
| CN | 103188595 | A | 7/2013 |
| CN | 103207732 | A | 7/2013 |
| CN | 103813228 | A | 5/2014 |
| CN | 104143325 | A | 11/2014 |
| CN | 104811543 | A | 7/2015 |
| CN | 104902389 | A | 9/2015 |
| CN | 105204816 | A | 12/2015 |
| CN | 105474663 | A | 4/2016 |
| CN | 105491469 | A | 4/2016 |
| CN | 105702271 | A | 6/2016 |
| WO | 2008070093 | A1 | 6/2008 |

OTHER PUBLICATIONS

Office Action issued in Chinese Application No. 201680085853.7 dated Oct. 30, 2019, 18 pages (with English translation).
Office Action issued in Chinese Application No. 201680085853.7 dated Nov. 19, 2020, 7 pages.
Extended European Search Report issued in European Application No. 16913894.8 dated Aug. 8, 2019, 8 pages.
Office Action issued in Chinese Application No. 201680085853.7 dated Jul. 3, 2020, 18 pages (with English translation).

* cited by examiner

First channel of audio data

Second channel of audio data

Left channel of audio data

Third audio data

AUDIO DATA PROCESSING METHOD, TERMINAL DEVICE, AND STORAGE MEDIUM

CROSS-REFERENCE TO RELATED APPLICATIONS

This application is a National Stage of International Application No. PCT/CN2016/097026, filed on Aug. 26, 2016, which is hereby incorporated by reference in its entirety

TECHNICAL FIELD

Embodiments of the present invention relate to communications technologies, and in particular, to an audio data processing method, a terminal device, and a storage medium.

BACKGROUND

Currently, as communications technologies continue to develop, terminal devices have become indispensable in life, and users are able to talk to or exchange information with others by using terminal devices anywhere anytime.

In the prior art, a plurality of pieces of audio data are set on a terminal device. After the terminal device receives an incoming call, the terminal device may control an audio device of the terminal device to play audio data corresponding to the incoming call, to alert a user to answer the incoming call.

However, when the incoming call is corresponding to two different pieces of audio data on the terminal device, the terminal device controls one or more audio output devices of the terminal device to play the two pieces of audio data simultaneously. When the two different pieces of audio data are mixed together during playback, the sound effects are relatively poor. As a result, human-machine interaction is not intelligent enough, and user experience is relatively poor.

SUMMARY

Embodiments of the present invention provide an audio data processing method, a terminal device, and a storage medium, to resolve a prior-art technical problem that sound effects are relatively poor when a terminal device plays two different pieces of audio data simultaneously because the two pieces of audio data are mixed together and played by one audio output device.

According to a first aspect, an embodiment of the present invention provides an audio data processing method, applied to a terminal device provided with a first audio output device and a second audio output device, where the method includes: obtaining, by the terminal device, first audio data and second audio data; converting, by the terminal device, the first audio data into a first channel of audio data, and converting the second audio data into a second channel of audio data; and outputting, by the terminal device, the first channel of audio data to the first audio output device, and/or outputting the second channel of audio data to the second audio output device.

According to the audio data processing method provided in the first aspect, after obtaining the first audio data and the second audio data, the terminal device may convert the first audio data into the first channel of audio data and convert the second audio data into the second channel of audio data. Then, the terminal device outputs the first channel of audio data to the first audio output device, and/or outputs the second channel of audio data to the second audio output device, so that different audio output devices output different audio data, or only one piece of the audio data is outputted by one audio output device. This makes human-machine interaction more intelligent, and also improves user experience.

Optionally, in a possible implementation of the first aspect, the first audio data is mono audio data, and the converting, by the terminal device, the first audio data into a first channel of audio data includes: using, by the terminal device, the first audio data as the first channel of audio data.

Optionally, in a possible implementation of the first aspect, the first audio data is multichannel audio data, and the converting, by the terminal device, the first audio data into a first channel of audio data includes: using, by the terminal device, audio data in at least one channel of the first audio data as the first channel of audio data.

Optionally, in a possible implementation of the first aspect, the using, by the terminal device, audio data in at least one channel of the first audio data as the first channel of audio data includes:
combining, by the terminal device, audio data in all channels of the first audio data, to generate mono audio data of the first audio data; and using, by the terminal device, the mono audio data of the first audio data as the first channel of audio data.

Optionally, in a possible implementation of the first aspect, the using, by the terminal device, audio data in at least one channel of the first audio data as the first channel of audio data includes:
deleting, by the terminal device, audio data in channels other than a first channel from the first audio data, and using audio data in the first channel of the first audio data as the first channel of audio data.

Optionally, in a possible implementation of the first aspect, before the outputting, by the terminal device, the first channel of audio data to the first audio output device, and/or outputting the second channel of audio data to the second audio output device, the method further includes: combining, by the terminal device, the first channel of audio data and the second channel of audio data into third audio data, where the first channel of audio data is audio data in a first channel of the third audio data, and the second channel of audio data is audio data in a second channel of the third audio data; and the outputting, by the terminal device, the first channel of audio data to the first audio output device, and/or outputting the second channel of audio data to the second audio output device includes:
performing, by the terminal device, path switching for the third audio data, to output the audio data in the first channel of the third audio data to the first audio output device and/or output the audio data in the second channel of the third audio data to the second audio output device.

According to the audio data processing method provided in the possible implementation, after converting the first audio data into the first channel of audio data and converting the second audio data into the second channel of audio data, the terminal device may first combine the first audio data and the second audio data into the third audio data. Then, the terminal device may perform path switching for the third audio data by using an audio chip of the terminal device, to output the first channel of audio data to the first audio output device and/or output the second channel of audio data to the second audio output device, so that different audio output devices output different audio data, or only one piece of the audio data is outputted by one audio output device. This makes human-machine interaction more intelligent, and also improves user experience.

Optionally, in a possible implementation of the first aspect, the outputting, by the terminal device, the first channel of audio data to the first audio output device includes: detecting, by the terminal device, whether an earphone is in contact with a user's ear or cheek; and if the earphone is in contact with the user's ear or cheek, outputting, by the terminal device, the first channel of audio data to the earphone.

Optionally, in a possible implementation of the first aspect, the outputting, by the terminal device, the second channel of audio data to the second audio output device includes: detecting, by the terminal device, whether an earphone is in contact with a user's ear or cheek; and if the earphone is not in contact with the user's ear or cheek, outputting, by the terminal device, the second channel of audio data to a speaker.

According to a second aspect, an embodiment of the present invention provides a terminal device, where the terminal device is provided with a first audio output device and a second audio output device, and the terminal device includes:

an obtaining module, configured to obtain first audio data and second audio data;

a conversion module, configured to convert the first audio data into a first channel of audio data, and convert the second audio data into a second channel of audio data; and an output module, configured to output the first channel of audio data to the first audio output device, and/or output the second channel of audio data to the second audio output device.

Based on a same inventive concept, for a problem-resolving principle and beneficial effects of the terminal device, reference may be made to the first aspect and the possible audio data processing method implementations of the first aspect and the beneficial effects thereof. Therefore, for implementation of the terminal device, reference may be made to the implementation of the method, and repetition is omitted.

According to a third aspect, an embodiment of the present invention provides a terminal device, where the terminal device is provided with a first audio output device and a second audio output device, and the terminal device includes a processor and a memory, where the memory is configured to store computer-executable program code, where the program code includes an instruction; and when the processor executes the instruction, the instruction causes the terminal device to execute the audio data processing method according to any one of the first aspect and the possible implementations of the first aspect. For problem-resolving implementations and beneficial effects of the terminal device, reference may be made to the first aspect and the possible audio data processing method implementations of the first aspect and the beneficial effects thereof. Therefore, for implementation of the terminal device, reference may be made to the implementation of the audio data processing method according to any one of the first aspect and the possible implementations of the first aspect, repetition is omitted.

According to a fourth aspect, an embodiment of the present invention provides a storage medium, where the storage medium is a nonvolatile computer-readable storage medium, the nonvolatile computer-readable storage medium stores at least one program, and each program includes a computer software instruction for use in a design scheme of the method of the first aspect, and when the instruction is executed by an electronic device provided with a processor, a transceiver, and an output device, the electronic device executes the audio data processing method according to any one of the first aspect and the possible implementations of the first aspect.

According to the audio data processing method, the terminal device, and the storage medium that are provided in the embodiments of the present invention, after obtaining the first audio data and the second audio data, the terminal device may convert the first audio data into the first channel of audio data and convert the second audio data into the second channel of audio data. Then, the terminal device outputs the first channel of audio data to the first audio output device, and/or outputs the second channel of audio data to the second audio output device, so that different audio output devices output different audio data, or only one piece of the audio data is outputted by one audio output device. This makes human-machine interaction more intelligent, and also improves user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
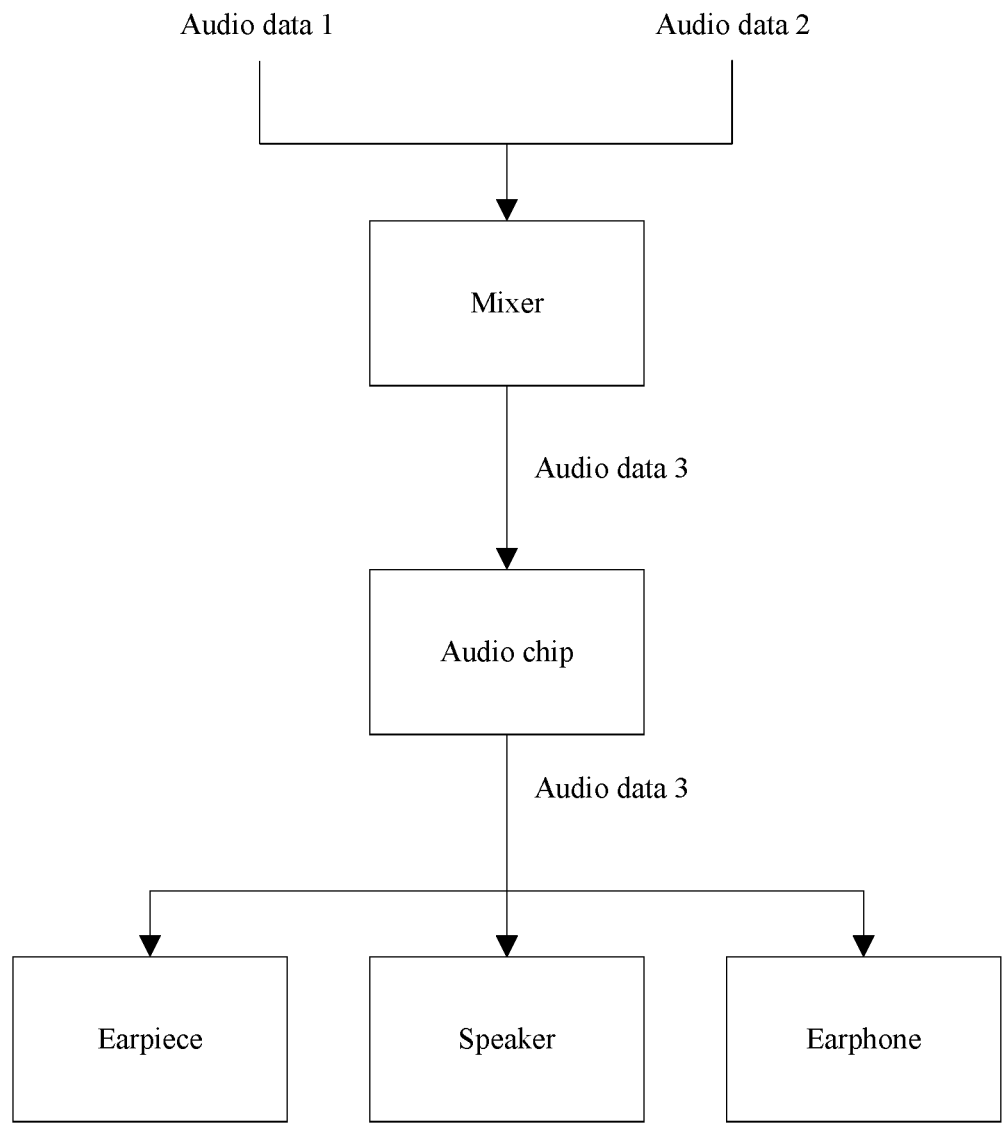
FIG. 1 is a schematic diagram of audio data processing by a terminal device in the prior art.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A terminal device in the embodiments of the present invention may be a device that provides voice and/or data connectivity for a user, a handheld device with a wireless connection function, or another processing device connected to a wireless modem. A wireless terminal may communicate with one or more core networks via a radio access network (Radio Access Network, RAN). The wireless terminal may be a mobile terminal, such as a mobile phone (also referred to as a "cellular" phone) and a computer provided with a mobile terminal, and for example, may be a portable, pocket-sized, handheld, computer built-in, or in-vehicle mobile apparatus, which exchanges voice and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

An audio data processing method provided in the embodiments of the present invention may be applicable to, for example, any terminal device that plays two different types of audio data simultaneously. Certainly, the audio data processing method in the embodiments of the present invention is not limited to the foregoing application scenario. For any scenario in which two different types of audio data are played simultaneously, the audio data processing method provided in the embodiments of the present invention may be used. In this application, the audio data processing method provided in the embodiments of the present invention is described in detail by using a terminal device as an example.

Currently, a terminal device may support simultaneous playing of a plurality of types of audio data. The audio data herein may be audio data that an audio chip of the terminal device is able to process, for example, ringtone audio data or voice announcement audio data.

An example is used in which a terminal device supports simultaneous playing of audio data 1 and audio data 2 when receiving an incoming call. FIG. 1 is a schematic diagram of audio data processing by a terminal device in the prior art. As shown in FIG. 1, after receiving an incoming call, the terminal device may first obtain audio data 1 and audio data 2 that are corresponding to the incoming call. Restricted by audio chip technologies, when receiving audio data, an audio chip of an existing terminal device is able to receive only one line of audio data. Therefore, before outputting the audio data 1 and the audio data 2 simultaneously to an audio output device by using the audio chip, the terminal device needs to combine the audio data 1 and the audio data 2 into one line of audio data (that is, audio data 3) by using a mixer. Then, the audio chip of the terminal device may output the audio data 3 to one or more available audio output devices based on availability statuses of audio output devices of the terminal device. The one or more audio output devices all output the audio data 3, achieving a purpose of playing simultaneously to a user the audio data 1 and the audio data 2 that are corresponding to the incoming call. The audio output device herein may be, for example, an earphone, a speaker, an earpiece, or an in-vehicle stereo. FIG. 1 is a schematic diagram of audio data processing in an example in which the audio output device is an earphone, a speaker, or an earpiece.

Figure 2:
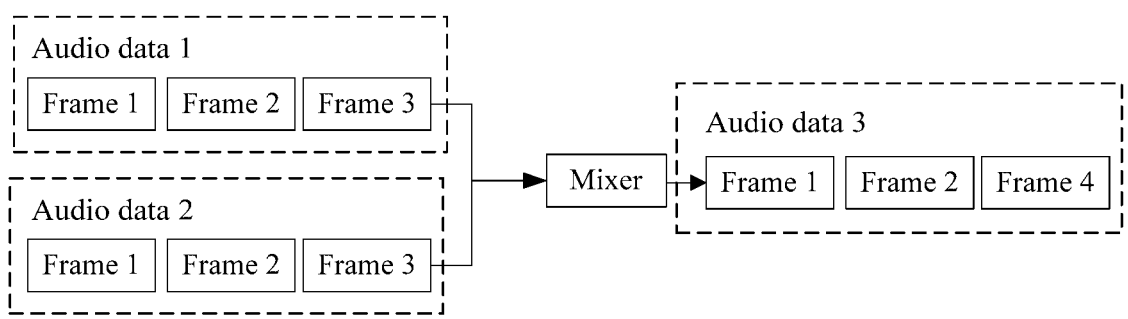
FIG. 2 is a schematic diagram of audio processing by a mixer in the prior art.

FIG. 2 is a schematic diagram of audio processing by a mixer in the prior art. As shown in FIG. 2, for example, the audio data 1 and the audio data 2 both include three frames of audio data: a frame 1, a frame 2, and a frame 3. When combining the audio data 1 and the audio data 2 into the audio data 3 by using a mixer of the terminal device, the terminal device mixes audio data in each channel of each frame of the audio data the audio data 1 and audio data in each channel of the same frame of audio data of the audio data 2 together. To be specific, the terminal device mixes audio data in each channel of the frame 1 of the audio data 1 and audio data in a corresponding channel of the frame 1 of the audio data 2, so that the frame 1 of the audio data 1 and the frame 1 of the audio data 2 are mixed to finally form a frame 1 of the audio data 3. This goes on until mixing of the last frame of the audio data 1 and the last frame of the audio data 2, that is, the frames 3, is completed. In other words, audio data in the frame 1 of the audio data 3 is a mixture of audio data in the frame 1 of the audio data 1 and audio data in the frame 1 of the audio data 2; audio data in the frame 2 of the audio data 3 is a mixture of audio data in the frame 2 of the audio data 1 and audio data in the frame 2 of the audio data 2; and audio data in the frame 3 of the audio data 3 is a mixture of audio data in the frame 3 of the audio data 1 and audio data in the frame 3 of the audio data 2.

In the foregoing manner, the terminal device can play simultaneously to the user the audio data 1 and the audio data 2 that are corresponding to the incoming call, by using one or more audio output devices to play the audio data 3. However, because the audio data 3 is a mixture of the audio data 1 and the audio data 2, sound effects are relatively poor when each audio output device plays the audio data 3. As a result, human-machine interaction is not intelligent enough, and user experience is relatively poor.

Therefore, the audio data processing method in the embodiments of the present invention is intended to resolve the prior-art technical problem that sound effects are relatively poor when a terminal device plays two different pieces of audio data simultaneously because the two pieces of audio data are mixed together and played by one audio output device.

The following describes in detail, by using specific embodiments, the technical solution of the present invention and how the foregoing technical problem is resolved by using the technical solution of the present invention. For the following several specific embodiments, mutual reference may be made, and a same or similar concept or process may not be described repeatedly in some embodiments.

Figure 3:
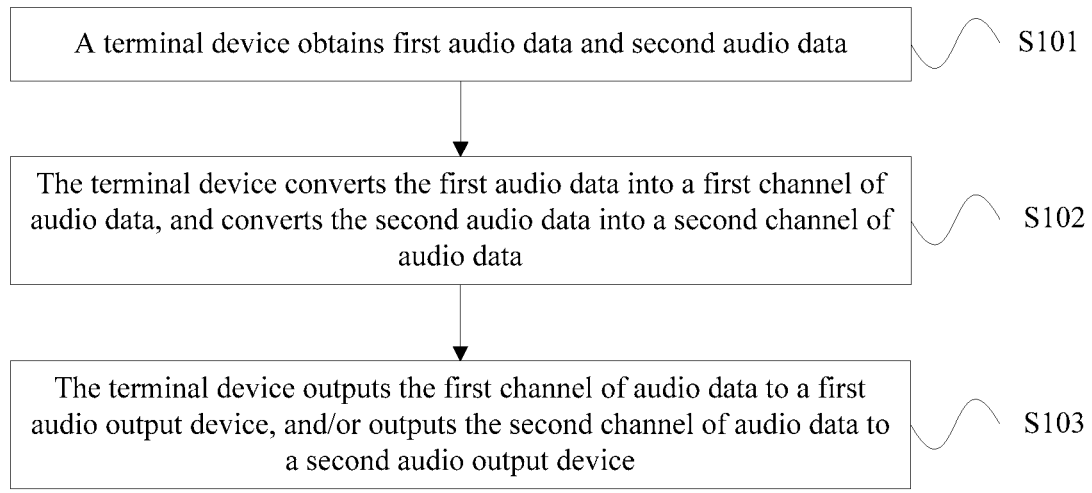
FIG. 3 is a schematic flowchart of an audio data processing method according to an embodiment of the present invention.

FIG. 3 is a schematic flowchart of an audio data processing method according to an embodiment of the present invention. This embodiment relates to a specific process how a terminal device outputs first audio data and second audio data that are obtained. In this embodiment, the terminal device is provided with a first audio output device and a second audio output device. The first audio output device and the second audio output device may be audio output devices built in the terminal device (for example, a speaker and an earpiece), or may be audio output devices having a wired connection relationship or a wireless connection relationship with the terminal device (for example, an earphone and an in-vehicle stereo). The first audio output device and the second audio output device may be different audio output devices. Specific settings may depend on user requirements. For example, when the first audio output device is a speaker, the second audio output device may be any one of an earpiece, an earphone, and an in-vehicle stereo. As shown in FIG. 3, the method may include the following steps.

S101: The terminal device obtains first audio data and second audio data.

Specifically, in this embodiment, after receiving a notification message, the terminal device may obtain first audio data and second audio data that are corresponding to the notification message, so as to play the first audio data and the second audio data to alert a user to view the notification message. The notification message mentioned above may be, for example, an incoming call notification message, an instant messaging notification message, a short message service notification message, a system pushed notification message, or a third-party application pushed notification message. The first audio data and the second audio data mentioned above may be audio data that an audio chip of the terminal device is able to process. In this embodiment, the first audio data and the second audio data may be different audio data. For example, the first audio data may be ringtone audio data, and the second audio data may be voice announcement audio data; or the first audio data may be voice announcement audio data, and the second audio data may be ringtone audio data.

In this embodiment, an implementation of obtaining the first audio data and the second audio data by the terminal device is not limited. For example, the terminal device may first determine, based on a preset mapping relationship between a notification message and first-audio-data and second-audio-data storage paths, a first-audio-data storage path and a second-audio-data storage path that are corresponding to the received notification message. Then, the terminal device may obtain the first audio data and the second audio data based on the storage paths.

S102: The terminal device converts the first audio data into a first channel of audio data, and converts the second audio data into a second channel of audio data.

Specifically, after obtaining the first audio data and the second audio data, the terminal device may convert the first audio data into the first channel of audio data, and convert the second audio data into the second channel of audio data.

The first channel and the second channel may be different channels. Using dual channels as an example, if the first channel is a left channel, the second channel may be a right channel; and if the first channel is a right channel, the second channel may be a left channel. During specific implementation, which channel is the first channel and which channel is the second channel may be adaptively adjusted based on design requirements.

An example is used in which the first audio data is converted into a first channel of audio data. A conversion process is described in detail later.

S103: The terminal device outputs the first channel of audio data to the first audio output device, and/or outputs the second channel of audio data to the second audio output device.

Specifically, after converting the first audio data into the first channel of audio data and converting the second audio data into the second channel of audio data, the terminal device may simultaneously output the first channel of audio data to the first audio output device and output the second channel of audio data to the second audio output device, by using the audio chip of the terminal device that is connected to the first audio output device and the second audio output device. Alternatively, the terminal device outputs only the first channel of audio data to the first audio output device by using the audio chip. Alternatively, the terminal device outputs only the second channel of audio data to the second audio output device by using the audio chip. During specific implementation, the terminal device may determine an output manner for the first audio data and the second audio data based on statuses of the first audio output device and the second audio output device.

In this embodiment, after obtaining two different pieces of audio data (that is, the first audio data and the second audio data), the terminal device may convert the different audio data into different channels of audio data. Then, the terminal device outputs the different channels of audio data to different audio output devices, implementing that different audio data is outputted by different audio output devices. Alternatively, the terminal device outputs one channel of the audio data to one of the audio output devices, implementing that only one piece of the audio data is outputted by one audio output device. This manner used, the problem of poor sound effects caused by simultaneous output of two different pieces of audio data by one audio output device is avoided. Therefore, by using the audio data processing method provided in this embodiment, human-machine interaction is more intelligent, and user experience is also improved.

According to the audio data processing method provided in this embodiment of the present invention, after obtaining the first audio data and the second audio data, the terminal device may convert the first audio data into the first channel of audio data and convert the second audio data into the second channel of audio data. Then, the terminal device outputs the first channel of audio data to the first audio output device, and/or outputs the second channel of audio data to the second audio output device, so that different audio output devices output different audio data, or only one piece of the audio data is outputted by one audio output device. This makes human-machine interaction more intelligent, and also improves user experience.

Further, based on the foregoing embodiment, for a specific process of converting the first audio data into the first channel of audio data by the terminal device, S102 may specifically include the following two cases.

Case 1: The first audio data is mono audio data. In this case, the terminal device may use the first audio data as the first channel of audio data.

Specifically, one piece of audio data is composed of a plurality of frames of audio data. Each frame of audio data includes a plurality of channels of audio data. The plurality of channels of audio data are sorted in order in the frame. To be specific, $1^{st}$ channel of data, $2^{nd}$ channel of data, ..., and $N^{th}$ channel of data are sorted in order. If one piece of audio data is mono data, specific audio data exists in only one channel in each frame of the audio data, and no audio data exists in other channels. That is, the other channels have no data.

When the first audio data is mono audio data, if a channel corresponding to the first audio data is the same as the first channel, the terminal device may directly use the first audio data as the first channel of audio data. If a channel corresponding to the first audio data is different from the first channel, for example, the channel is the second channel, the terminal device may copy audio data in the second channel of each frame of the audio data the first audio data, into the first channel of the frame, so that audio data in the first channel of this frame of audio data is specific audio data. Correspondingly, the terminal device may delete audio data in the second channel of each frame of the audio data the first audio data, to convert the first audio data into the first channel of audio data. In this way, the terminal device can output the first channel of audio data (that is, the first audio data) to the first audio output device by using the audio chip when the first audio output device is in an idle state, so that the first audio output device plays the first channel of audio data (that is, the first audio data).

Case 2: The first audio data is multichannel audio data. In this case, the terminal device may use audio data in at least one channel of the first audio data as the first channel of audio data.

Specifically, in this embodiment, the first audio data is multichannel audio data, which means each frame of the audio data the first audio data includes audio data in a plurality of channels.

Optionally, the terminal may combine audio data in all channels of the first audio data. To be specific, the terminal device may combine audio data in the plurality of channels of each frame of the audio data the first audio data, to generate mono audio data of the first audio data. Then, the terminal device may use the mono audio data of the first audio data as the first channel of audio data. In this way, the terminal device can output the first channel of audio data (that is, the first audio data) to the first audio output device by using the audio chip when the first audio output device is in an idle state, so that the first audio output device plays the first channel of audio data (that is, the first audio data).

Optionally, the terminal device may delete audio data in channels other than a first channel from the first audio data. To be specific, the terminal device may delete, audio data in channels other than the first channel from each frame of audio data in the first audio data, and retain only audio data in the first channel of each frame of audio data, so that the first audio data becomes mono audio data. Then, the terminal device may use the audio data in the first channel of the first audio data as the first channel of audio data. In this way, the terminal device can output the first channel of audio data (that is, the first audio data) to the first audio output device by using the audio chip when the first audio output device is in an idle state, so that the first audio output device plays the first channel of audio data (that is, the first audio data).

Optionally, the terminal device may determine, based on a sound effect produced by audio data in each channel of each frame of the audio data the first audio data, audio data in which channel of the frame of audio data is to be retained. An example is used in which audio data in a channel with a best sound effect is selected. The terminal device may delete, from each frame of the audio data the first audio data, audio data in channels other than the "audio data in the channel with the best sound effect", and use the audio data in the channel with the best sound effect as audio data in a first channel of the frame, so as to ensure a playback sound effect for the first audio data while the first audio data becomes mono audio data. Then, the terminal device may use the audio data in the first channel of the first audio data as the first channel of audio data. In this way, the terminal device can output the first channel of audio data (that is, the first audio data) to the first audio output device by using the audio chip when the first audio output device is in an idle state, so that the first audio output device plays the first channel of audio data (that is, the first audio data). For details about how the terminal device determines, based on a sound effect produced by audio data in each channel of each frame of the audio data the first audio data, audio data in which channel of the frame of audio data is retained, refer to the prior art. This embodiment of the present invention is not specifically limited in this sense.

A processing manner of converting the second audio data into the second channel of audio data by the terminal device when the second audio data is mono audio data or multichannel audio data is the same as the manner of converting the first audio data into the first channel of audio data. Therefore, a specific process of converting the second audio data into the second channel of audio data by the terminal device is not described in this embodiment of the present invention.

Optionally, in another implementation of the present invention, before converting the first audio data into the first channel of audio data, the terminal device may further determine whether the first audio data is mono audio data or multichannel audio data. Then, the terminal device can determine, based on a determining result, whether to use the processing manner in case 1 or the processing manner in case 2, to convert the first audio data into the first channel of audio data. During specific implementation, the terminal device may determine, based on a quantity of channels of audio data included in each frame of the audio data the first audio data, whether the first audio data is mono audio data or multichannel audio data.

According to the audio data processing method provided in this embodiment of the present invention, after obtaining the first audio data and the second audio data, the terminal device may convert the first audio data into the first channel of audio data and convert the second audio data into the second channel of audio data. Then, the terminal device may output the first channel of audio data to the first audio output device, and/or output the second channel of audio data to the second audio output device, so that different audio output devices output different audio data, or only one piece of the audio data is outputted by one audio output device. This makes human-machine interaction more intelligent, and also improves user experience.

As described in the foregoing embodiment, the terminal device may output the first channel of audio data to the first audio output device, and/or output the second channel of audio data to the second audio output device, by using the audio chip of the terminal device that is connected to the first audio output device and the second audio output device.

Therefore, this embodiment of the present invention includes a specific process of combining the first channel of audio data and the second channel of audio data into third audio data by the terminal device, and before S103, the method may further include: combining the first channel of audio data and the second channel of audio data into third audio data.

In the prior art, restricted by audio chip technologies, although an audio chip of an existing terminal device is able to output different channels of audio data to different audio output devices, the audio chip is able to receive only one line of audio data (that is, one piece of audio data) when receiving audio data. This means that the audio chip is unable to receive a first channel of audio data and a second channel of audio data simultaneously. Therefore, after converting the first audio data into the first channel of audio data, and converting the second audio data into the second channel of audio data, the terminal device may combine the first channel of audio data and the second channel of audio data into third audio data (that is, into one line of audio data). In this case, the audio chip may correctly receive the first channel of audio data and the second channel of audio data by receiving the third audio data.

Figure 4:
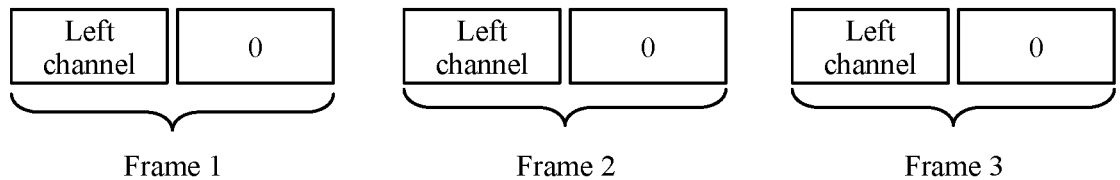
FIG. 4 is a schematic diagram of a first channel of audio data and a second channel of audio data according to an embodiment of the present invention.
Figure 4:
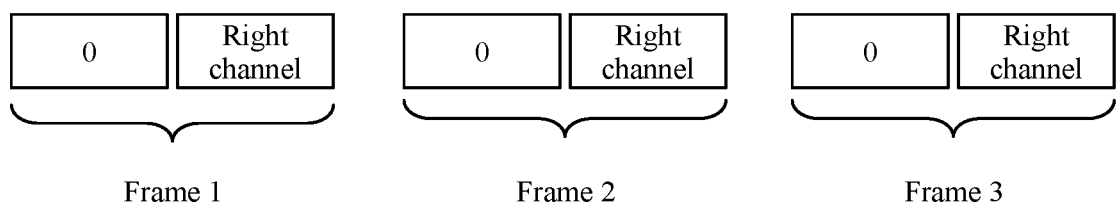

FIG. 4 is a schematic diagram of a first channel of audio data and a second channel of audio data according to an embodiment of the present invention. Using dual channels as an example, it is assumed that the first channel is a left channel, and the second channel is a right channel. The first channel of audio data and the second channel of audio data both include three frames of audio data. The first channel of audio data and the second channel of audio data may be shown in FIG. 4. To be specific, for each frame of the audio data the first channel of audio data, specific audio data exists in the left channel (that is, the first channel), whereas audio data in the right channel is 0. For each frame of the audio data the second channel of audio data, specific audio data exists in the right channel (that is, the second channel), whereas audio data in the left channel have no audio data.

Figure 5:
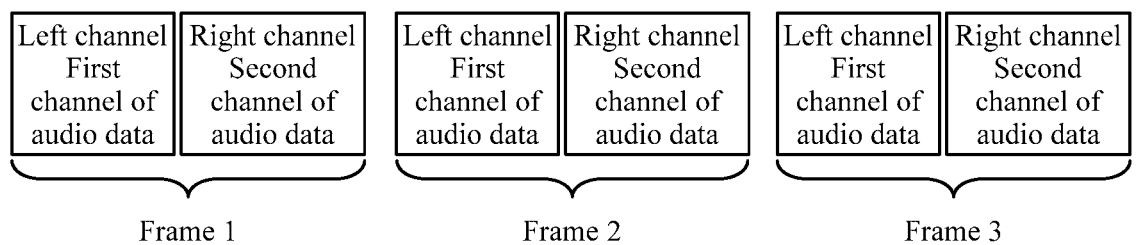
FIG. 5 is a schematic diagram of third audio data according to an embodiment of the present invention.

After the terminal device combines the first channel of audio data and the second channel of audio data shown in FIG. 4 into third audio data (that is, one line of audio data) by using the mixer of the terminal device, although the third audio data includes both the two pieces of audio data, data in each frame of one piece of audio data and data in the same frame of the other piece of audio data occupy different channels in each frame of audio data of the third audio data. FIG. 5 is a schematic diagram of third audio data according to an embodiment of the present invention. As shown in FIG. 5, audio data in a left channel of each frame of audio data of the third audio data is the first channel of audio data; and audio data in a right channel of each frame of the audio data the third audio data is the second channel of audio data.

Therefore, when the terminal device sends the third audio data to the audio chip of the terminal device, the audio chip can correctly receive the third audio data. To be specific, the audio chip can receive the first channel of audio data and the second channel of audio data simultaneously. Then, the audio chip of the terminal device may perform path switching for the third audio data, to output audio data in a first channel of each frame of the audio data the third audio data (that is, the first channel of audio data) to the first audio output device and/or output audio data in a second channel of each frame of the audio data the third audio data (that is, the second channel of audio data) to the second audio output device. In this way, different audio output devices output different audio data, or only one piece of the audio data is outputted by one audio output device. This makes human-machine interaction more intelligent, and also improves user experience.

Restricted by technologies, an audio chip of an existing terminal device is unable to receive two lines of audio data simultaneously, that is, unable to receive two pieces of audio data simultaneously. Therefore, a mixer is required to mix two pieces of audio data into one line of audio data before the audio data is transmitted to the audio chip. After the audio chip outputs the one line of audio data resulting from mixing to a corresponding audio output device, the audio output device may play the mixed audio data to a user. However, because the two lines of audio are mixed and played by one audio output device, sound effects are relatively poor, and user experience is relatively poor.

However, in this embodiment, the first channel of audio data and the second channel of audio data are audio data in different channels. Therefore, when the first channel of audio data and the second channel of audio data are mixed into one line of audio data by using the mixer, the first channel of audio data and the second channel of audio data may be located in different channels of the audio data, rather than mixed into one channel. In this way, when performing path switching to output the different channels of audio data that are combined into one line of audio data (that is, the third audio data) to different audio output devices, the audio chip may output the first channel of audio data and the second channel of audio data to different audio output devices, or output only one of the channels of audio data, without occurrence that one audio output device simultaneously plays two pieces of audio data that are mixed into one line of audio data. Therefore, the problem of relatively poor sound effects is avoided, human-machine interaction is made more intelligent, and user experience is also improved.

It should be noted that persons skilled in the art may understand that, as technologies develop, if the terminal device is able to avail another approach to output the first audio data and the second audio data to different audio output devices or output only one piece of the audio data by using one audio output device, the terminal device may no longer be provided with the audio chip and the mixer. This means that the method provided in the embodiments of the present invention may be implemented without combination of the first audio data and the second audio data into the third audio data.

According to the audio data processing method provided in this embodiment of the present invention, after converting the first audio data into the first channel of audio data and converting the second audio data into the second channel of audio data, the terminal device may first combine the first audio data and the second audio data into the third audio data. Then, the terminal device may perform path switching for the third audio data by using the audio chip of the terminal device, to output the first channel of audio data to the first audio output device and/or output the second channel of audio data to the second audio output device, so that different audio output devices output different audio data, or only one piece of the audio data is outputted by one audio output device. This makes human-machine interaction more intelligent, and also improves user experience.

Figure 6:
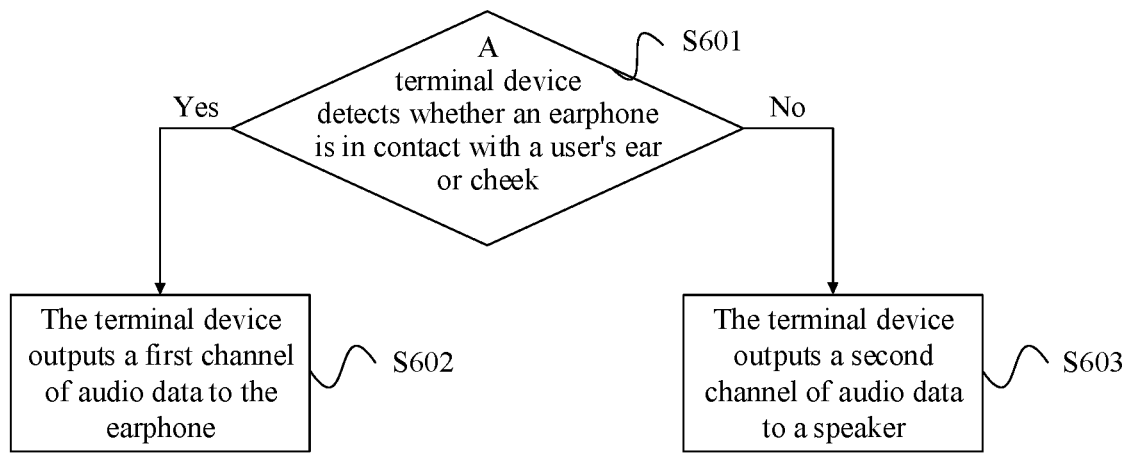
FIG. 6 is a schematic flowchart of another audio data processing method according to an embodiment of the present invention.

FIG. 6 is a schematic flowchart of another audio data processing method according to an embodiment of the present invention. In this embodiment, the first audio output device is an earphone, and the second audio output device is a speaker. This embodiment relates to a specific process of outputting the first channel of audio data to the first audio output device, and/or outputting the second channel of audio data to the second audio output device by the terminal device. S103 may include the following steps.

S601: The terminal device detects whether the earphone is in contact with a user's ear or cheek. If the earphone is in contact with the user's ear or cheek, S602 is performed; or if the earphone is not in contact with the user's ear or cheek, S603 is performed.

Specifically, the terminal device may detect whether the earphone is in contact with the user's ear or cheek, after converting the first audio data into the first channel of audio data and converting the second audio data into the second channel of audio data.

Optionally, if the earphone is configured with a thermistor, the terminal device may determine whether the earphone is in contact with the user's ear or cheek by checking whether a thermal temperature fed back by the earphone matches a preset temperature. Optionally, if the earphone is configured with an infrared sensor, the terminal device may determine whether the earphone is in contact with the user's ear or cheek by checking whether an infrared temperature fed back by the earphone reaches a body temperature. Optionally, for example, if the earphone is configured with a metal electrode for measuring a human skin conductance value, the terminal device may determine whether the earphone is in contact with the user's ear or cheek by checking whether a skin conductance value fed back by the earphone reaches a preset threshold. Optionally, the terminal device may determine, in other existing manners, whether the earphone is in contact with the user's ear or cheek. Specific implementations thereof are not limited in this embodiment of the present invention.

S602: The terminal device outputs the first channel of audio data to the earphone.

Specifically, when detecting that the earphone is in contact with the user's ear or cheek, the terminal device may output only the first channel of audio data to the earphone. In this way, the terminal device can implement that only one piece of audio data is outputted by one audio output device. Therefore, the problem of relatively poor sound effects of the terminal device caused when two different types of audio data are mixed because the terminal device uses one audio output device to output two different pieces of audio data simultaneously, is avoided, making human-machine interaction more intelligent and user experience improved.

S603: The terminal device outputs the second channel of audio data to the speaker.

Specifically, when detecting that the earphone is not in contact with the user's ear or cheek, the terminal device may output only the second channel of audio data to the speaker. In this way, the terminal device can implement that only one piece of audio data is outputted by one audio output device. Therefore, the problem of relatively poor sound effects of the terminal device caused when two different types of audio data are mixed because the terminal device uses one audio output device to output two different pieces of audio data simultaneously, is avoided, making human-machine interaction more intelligent and user experience improved.

Optionally, in another implementation of the present invention, when detecting whether the earphone is in contact with the user's ear or cheek, the terminal device may further determine whether the speaker is available for output. When the speaker is available for output, the speaker can play a ringtone. When the speaker is not available for output, the speaker is in a silent mode. When the terminal device detects that the earphone is in contact with the user's ear or cheek, and determines that the speaker is available for output, the terminal device may further output the first channel of audio data to the earphone and output the second channel of audio data to the speaker. In this way, the terminal device can output different audio data by using different audio output devices. This can avoid the problem of relatively poor sound effects of the terminal device caused when two different types of audio data are mixed because the terminal device uses one audio output device to output two different pieces of audio data simultaneously. Hence, human-machine interaction is more intelligent, and user experience is also improved.

In this embodiment, a specific implementation is not limited for the terminal device to determine whether the speaker is available for output. For example, the terminal device may determine whether the speaker is available for output based on a profile specified by the user on the terminal device, or may determine whether the speaker is available for output in an existing manner. Specific implementations thereof are not limited in this embodiment of the present invention.

According to the audio data processing method provided in this embodiment of the present invention, after obtaining the first audio data and the second audio data, the terminal device may convert the first audio data into the first channel of audio data, and convert the second audio data into the second channel of audio data, and may further output the first channel of audio data to the first audio output device, and/or output the second channel of audio data to the second audio output device, so that different audio output devices can output different audio data, or only one piece of the audio data is outputted by one audio output device. This makes human-machine interaction more intelligent, and also improves user experience.

Figure 7:
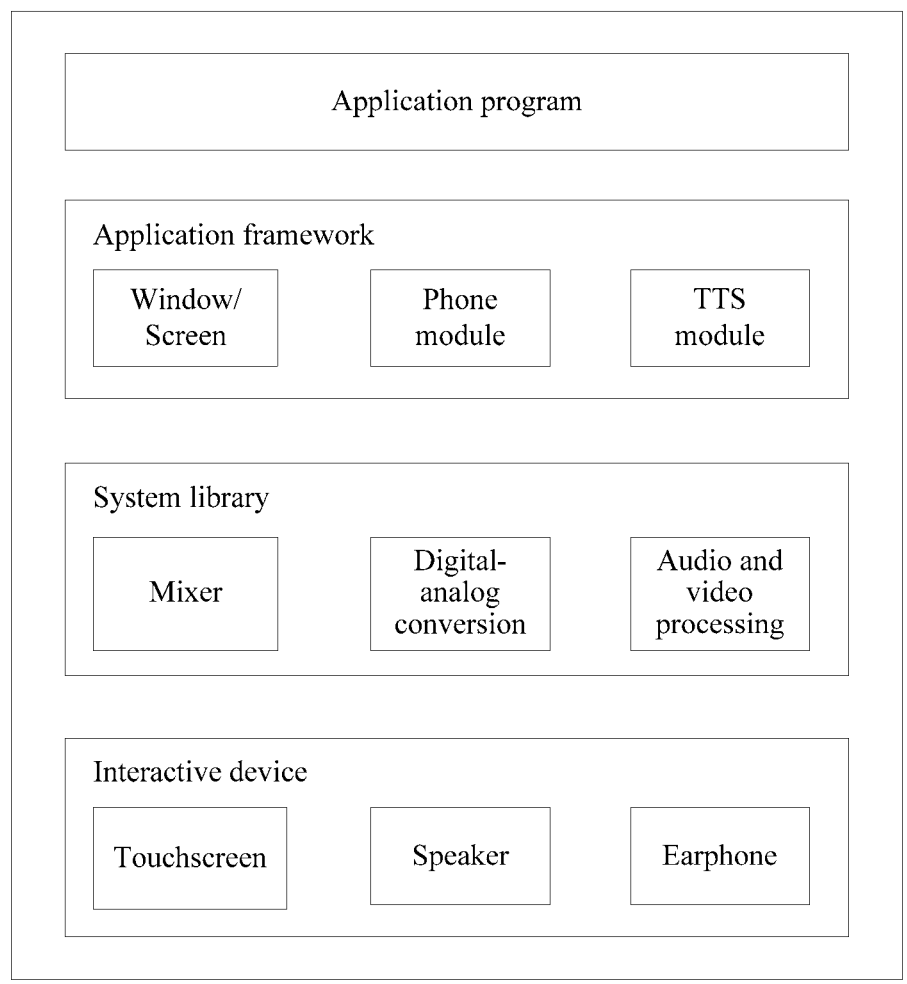
FIG. 7 is a schematic diagram of an operating environment of a terminal device according to an embodiment of the present invention.

FIG. 7 is a schematic diagram of an operating environment of a terminal device according to an embodiment of the present invention. As shown in FIG. 7, in this example, from top down, a system running on the terminal device may include application programs, application frameworks, system libraries, and interactive devices. The application programs may be various applications, such as WeChat and QQ, installed on the terminal device. The application frameworks may include various frameworks that provide framework services for the application programs, for example, windows/screens, a phone module, and a text-to-speech (text-to-speech, TTS for short) module. During specific implementation, these frameworks may run in Java space. The system libraries may include various system libraries and kernel drivers, for example, those for a mixer, digital-analog conversion, and audio and video processing. During specific implementation, the system libraries may run in C/C++ space. The interactive devices may include various devices that a user can directly touch or interact with, for example, a touchscreen, a speaker (that is, an audio output device), and an earphone (that is, an audio output device).

An example is used in which the operating system on the terminal device is an Android operating system. When implementing the audio data processing method provided in the embodiments of the present invention, the terminal device may use a hardware device (that is, an audio chip) of the terminal device or may use a hardware device and software modules of the terminal device jointly to implement the audio data processing method provided in the embodiments of the present invention. These software modules may be, for example, application modules corresponding to the application programs, audio processing modules (referred to as AudioTracks in this example), a mixer (referred to as an AudioMixer in this example), and an audio path module (referred to as an Audio_cust in this example).

The application module is configured to receive a notification message, and obtain first audio data and second audio data that are corresponding to the notification message after receiving the notification message. Each AudioTrack is corresponding to one piece of audio data. In this embodiment, two AudioTracks are included. One of the AudioTracks is configured to convert the first audio data into a first channel of audio data, and the other AudioTrack is configured to convert the second audio data into a second channel of audio data. The AudioMixer is configured to combine the first channel of audio data and the second channel of audio data into third audio data. The Audio_cust is configured to perform path switching for the third audio data, so that the first channel of audio data is outputted to a first audio output device, and the second channel of audio data is outputted to a second audio output device.

Figure 8A:
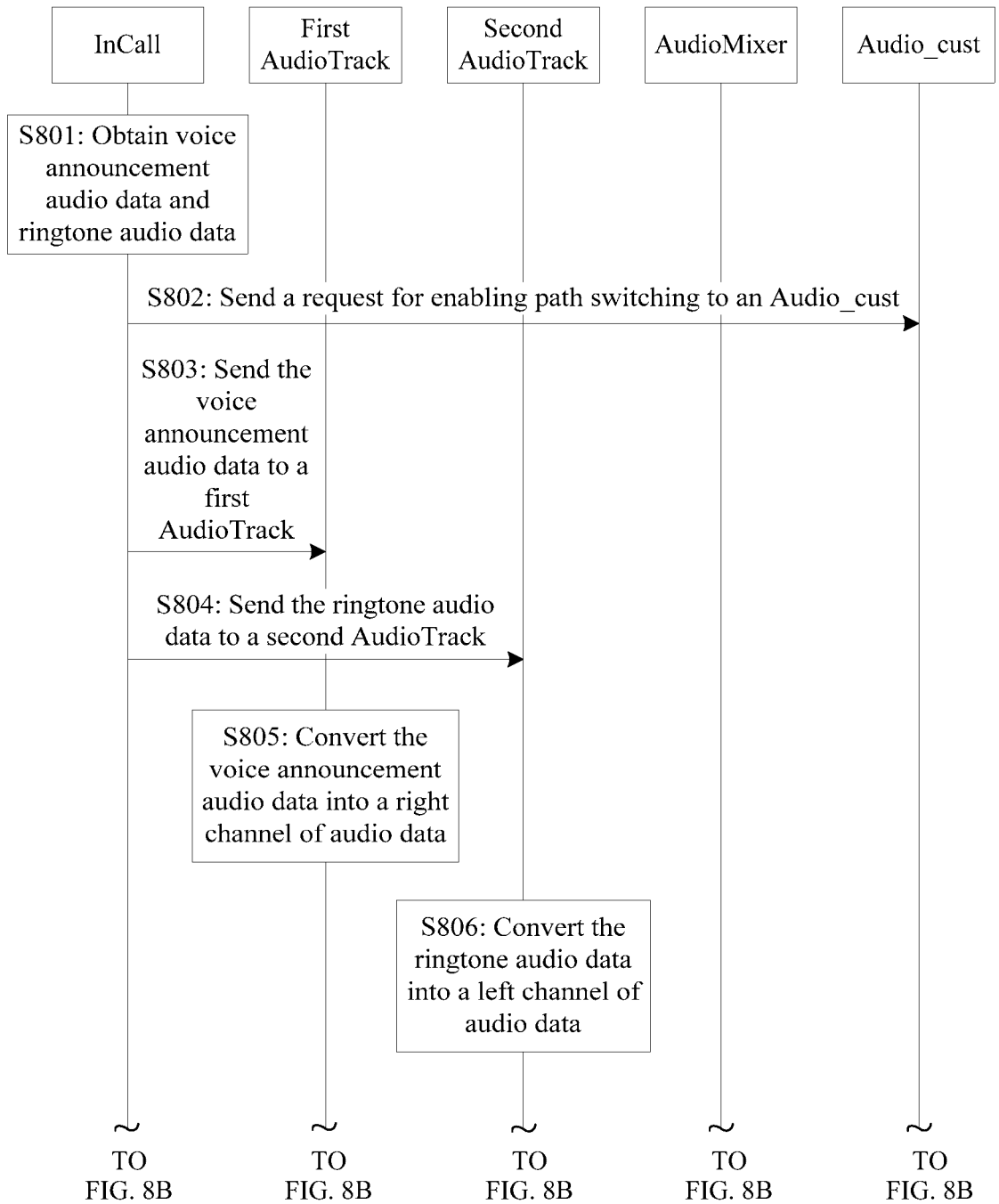
FIG. 8A and FIG. 8B are a signaling flowchart of an audio data processing method according to an embodiment of the present invention.
Figure 8B:
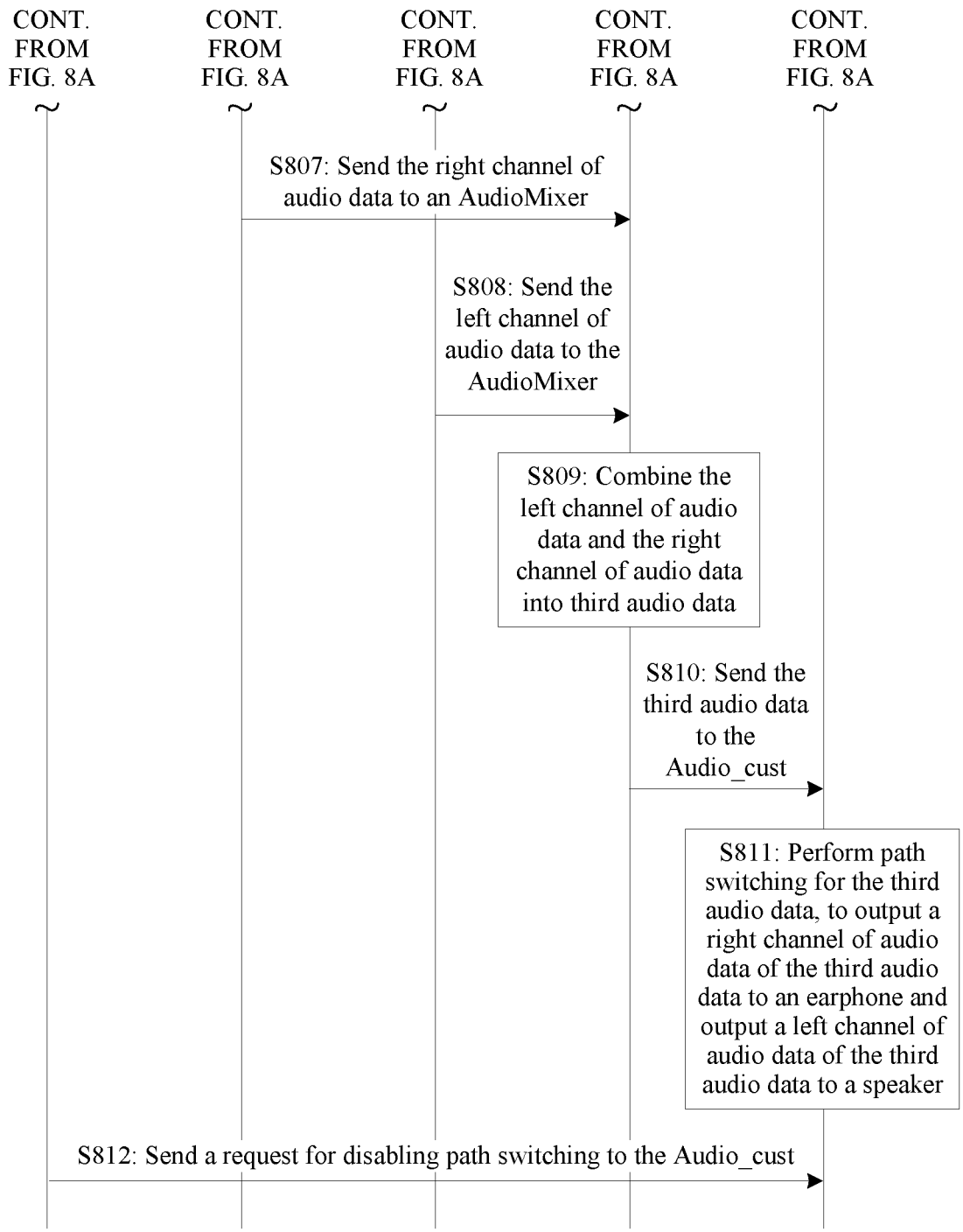

The following describes in detail the audio data processing method provided in the embodiments of the present invention by using an example in which the terminal device receives an incoming call notification. In this embodiment, the first audio output device is an earphone, and the second audio output device is a speaker. An executing entity may be application layer software InCall. The InCall receives an incoming call notification message when the terminal device receives an incoming call. The InCall may execute, based on the incoming call notification message, the audio data processing method provided in the embodiments of the present invention. The first audio data is voice announcement audio data, and the second audio data is ringtone audio data. The first audio data and the second audio data are both dual-channel audio data. A first channel is a right channel, and a second channel is a left channel. The terminal device outputs the voice announcement audio data to the earphone and outputs the ringtone audio data to the speaker. FIG. 8A and FIG. 8B are a signaling flowchart of an audio data processing method according to an embodiment of the present invention. As shown in FIG. 8A and FIG. 8B, the method includes the following steps.

S801: The InCall obtains voice announcement audio data and ringtone audio data.

Specifically, after receiving the incoming call notification message, the InCall may call an underlying interface to obtain the voice announcement audio data and the ringtone audio data. For a specific implementation thereof, refer to the prior art. Details are not described herein.

S802: The InCall sends a request for enabling path switching to the Audio_cust.

Specifically, after receiving the incoming call notification message, the InCall may send the request for enabling path switching to the Audio_cust, so that the Audio_cust switches to a voice announcement and ringtone path. Therefore, after receiving the third audio data resulting from combination of the voice announcement audio data and the ringtone audio data, the Audio_cust may output the voice announcement audio data to the earphone and output the ringtone audio data to the speaker through path switching.

During specific implementation, the request for enabling path switching may be, for example, implemented by using the following code:

define TTS_RING_ON "tts_ring_on" //switch to a TTS and ringtone path (specifically, output a left channel to the speaker and output a right channel to the earphone)

It should be noted that s801 and s802 may be performed not in a particular order.

s803: The InCall sends the voice announcement audio data to a first AudioTrack.

Specifically, when the InCall sends the voice announcement audio data to the first AudioTrack, to make the first AudioTrack know which audio data is stored in the first AudioTrack, the InCall may further add an identifier to a $1^{st}$ frame of audio data of the audio data stored in the first AudioTrack, to identify the audio data. During specific implementation, the InCall may add the following identifier to a $1^{st}$ frame of audio data of the voice announcement audio data stored in the first AudioTrack:

define TAG_TTS_MIX_TO_RIGHT "tts_mix_to_right"

s804: The InCall sends the ringtone audio data to a second AudioTrack.

Specifically, when the InCall sends the ringtone audio data to the second AudioTrack, to make the second AudioTrack know which audio data is stored in the second AudioTrack, the InCall may further add an identifier to a $1^{st}$ frame of audio data of the audio data stored in the second AudioTrack, to identify the audio data. During specific implementation, the InCall may add the following identifier to a $1^{st}$ frame of audio data of the ringtone audio data stored in the second AudioTrack:

define TAG_RING_MIX_TO_LEFT "ring_mix_to_left"

S805: The first AudioTrack converts the voice announcement audio data into a right channel of audio data.

Figure 9:
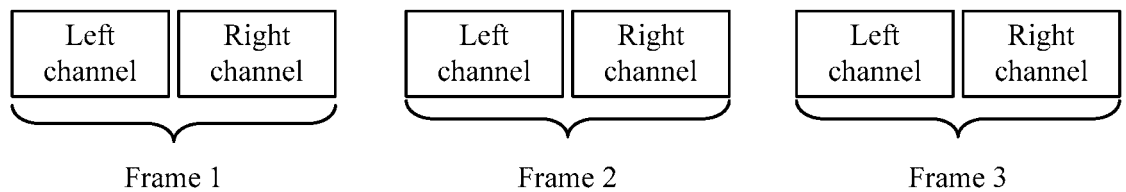
FIG. 9 is a schematic diagram of voice announcement audio data according to an embodiment of the present invention.

FIG. 9 is a schematic diagram of voice announcement audio data according to an embodiment of the present invention. As shown in FIG. 9, each frame of the audio data the voice announcement audio data received by the first AudioTrack includes a left channel of audio data and a right channel of audio data. In this case, after receiving the audio data sent by the InCall, and knowing, based on an identifier in the audio data, that the audio data received by the first AudioTrack is voice announcement audio data, the first AudioTrack may perform channel separation on the voice announcement audio data in the following manner, so that only the right channel of audio data of the voice announcement audio data is retained.

Specifically:

All frames of audio data of the voice announcement audio data are sequentially traversed, and then for each frame of audio data, data in the right channel is retained and data in the left channel is set to 0. During specifically implementation, the following code may be used for implementation:

```
for (int i=0; i<buffer_length; i++) {
    if(mMixType == TAG_RING_MIX_TO_LEFT){
        if(i%2 == 0)//left channel
            buffer[i] = 0;//clear data
    }
}
```

Figure 10:
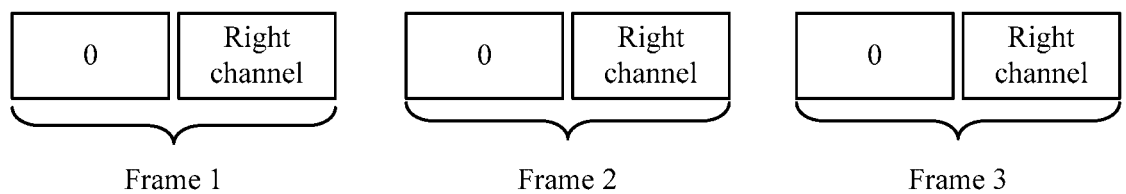
FIG. 10 is a schematic diagram of a right channel of audio data according to an embodiment of the present invention.

FIG. 10 is a schematic diagram of a right channel of audio data according to an embodiment of the present invention. As shown in FIG. 10, after the first AudioTrack performs channel separation on the voice announcement audio data, each frame of the audio data the voice announcement audio data includes only audio data in the right channel, and audio data in the left channel is set to 0, so that the voice announcement audio data is converted into the right channel of audio data.

S806: The second AudioTrack converts the ringtone audio data into a left channel of audio data.

Figure 11:
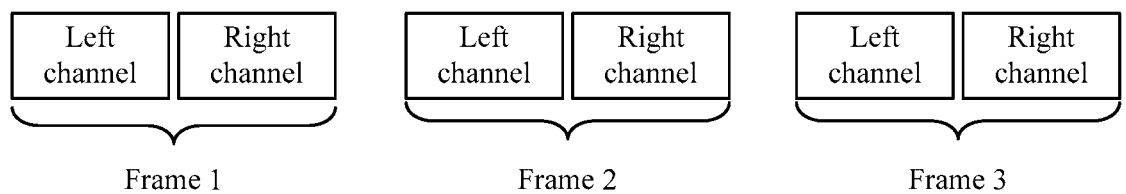
FIG. 11 is a schematic diagram of ringtone audio data according to an embodiment of the present invention.

Specifically, FIG. 11 is a schematic diagram of ringtone audio data according to an embodiment of the present invention. As shown in FIG. 11, each frame of the audio data the ringtone audio data received by the second AudioTrack includes a left channel of audio data and a right channel of audio data. In this case, after receiving the audio data sent by the InCall, and knowing, based on an identifier in the audio data, that the audio data received by the second AudioTrack is ringtone audio data, the second AudioTrack may perform channel separation on the ringtone audio data in the following manner, so that only the left channel of audio data of the ringtone audio data is retained. Specifically:

All frames of audio data of the ringtone audio data are sequentially traversed, and then for each frame of audio data, data in the left channel is retained and data in the right channel is set to 0. During specifically implementation, the following code may be used for implementation:

```
for (int i=0; i<buffer_length; i++) {
    if(mMixType == TAG_RING_MIX_TO_LEFT){
        if(i%2 == 1)//right channel
            buffer[i] = 0;//clear data
    }
}
```

Figure 12:
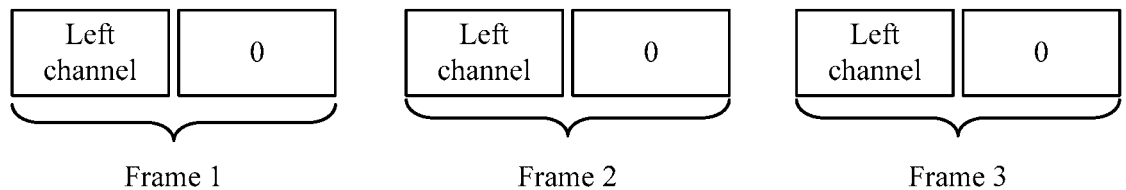
FIG. 12 is a schematic diagram of a left channel of audio data according to an embodiment of the present invention.

FIG. 12 is a schematic diagram of a left channel of audio data according to an embodiment of the present invention. As shown in FIG. 12, after the second AudioTrack performs channel separation on the ringtone audio data, each frame of the audio data the ringtone audio data includes only audio data in the left channel, and audio data in the right channel is set to 0, so that the ringtone audio data is converted into the left channel of audio data.

S807: The first AudioTrack sends the right channel of audio data to the AudioMixer.

S808: The second AudioTrack sends the left channel of audio data to the AudioMixer.

S809: The AudioMixer combines the left channel of audio data and the right channel of audio data into third audio data.

Figure 13:
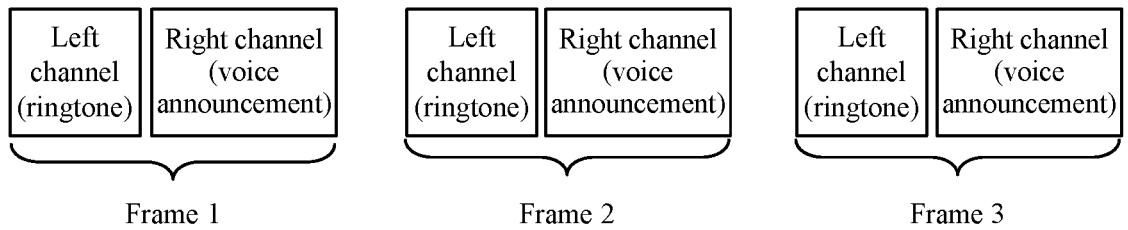
FIG. 13 is a schematic diagram of third audio data according to an embodiment of the present invention.

Specifically, after receiving the right channel of audio data (that is, the voice announcement audio data) and the left channel of audio data (that is, the ringtone audio data), the AudioMixer may perform audio mixing by using a prior interface, to generate the third audio data. A basic principle of audio mixing is: During mixing of two lines of dual-channel audio data, if data in one channel of one line of audio data is 0, data in the corresponding channel of the other line of audio data is directly used as data in the corresponding channel resulting from audio mixing. Therefore, the third audio data generated through audio mixing may be shown as follows. FIG. 13 is a schematic diagram of third audio data according to an embodiment of the present invention. As shown in FIG. 13, audio data in the left channel of each frame of the third audio data is ringtone audio data, and audio data in the right channel of each frame of the third audio data is voice announcement audio data.

S810: The AudioMixer sends the third audio data to the Audio_cust.

S811: The Audio_cust performs path switching for the third audio data, to output a right channel of audio data of the third audio data to the earphone and output a left channel of audio data of the third audio data to the speaker.

Specifically, after receiving the third audio data, the Audio_cust outputs the right channel of audio data of the third audio data (that is, the voice announcement audio data) to the earphone, and outputs the left channel of audio data of the third audio data (that is, the ringtone audio data) to the speaker.

S812: The InCall sends a request for disabling path switching to the Audio_cust.

Specifically, after the speaker outputs the ringtone audio data and the earphone outputs the voice announcement audio data, the InCall may send the request for disabling path switching to the Audio_cust, so that the Audio_cust switches the path to an original path mode. The original path mode is, for example, outputting audio data to only one audio output device.

During specific implementation, the request for disabling path switching may be, for example, implemented by using the following code:

define TTS_RING_OFF "tts_ring_off" //switch back to the original path

Now, the terminal device has completed a function of outputting the voice announcement audio data to a user by using the earphone and outputting the ringtone audio data to the user by using the speaker after receiving the incoming call notification. Therefore, the terminal device can output different audio data by using different audio output devices, to alert the user to check an incoming call. This makes human-machine interaction more intelligent, and also improves user experience.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 14:
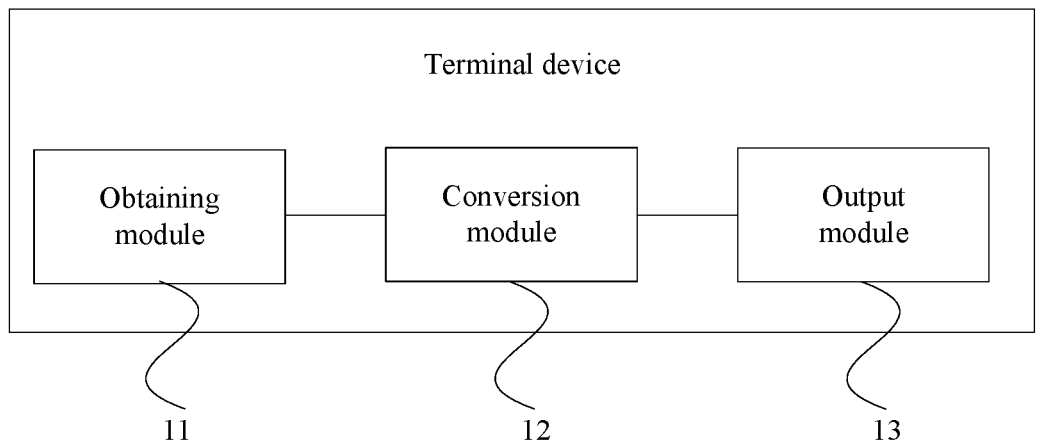
FIG. 14 is a schematic structural diagram of a terminal device according to an embodiment of the present invention.

FIG. 14 is a schematic structural diagram of a terminal device according to an embodiment of the present invention. In this embodiment, the terminal device is provided with a first audio output device and a second audio output device. As shown in FIG. 14, the terminal device may include an obtaining module 11, a conversion module 12, and an output module 13.

The obtaining module 11 is configured to obtain first audio data and second audio data. Optionally, the first audio data may be voice announcement audio data, and the second audio data may be ringtone audio data.

The conversion module 12 is configured to convert the first audio data into a first channel of audio data, and convert the second audio data into a second channel of audio data.

The output module 13 is configured to output the first channel of audio data to the first audio output device, and/or output the second channel of audio data to the second audio output device.

The terminal device provided in this embodiment of the present invention may execute the foregoing method embodiment. An implementation principle and a technical effect of the terminal device are similar to those of the method embodiment, and further details are not described herein.

Optionally, if the first audio data is mono audio data, the conversion module 12 may be specifically configured to use the first audio data as the first channel of audio data. Optionally, if the first audio data is multichannel audio data, the conversion module 12 may be specifically configured to use audio data in at least one channel of the first audio data as the first channel of audio data. During specific implementation, the conversion module 12 may combine audio data in all channels of the first audio data, to generate mono audio data of the first audio data; and use the mono audio data of the first audio data as the first channel of audio data. Alternatively, for example, the conversion module 12 may delete audio data in channels other than a first channel from the first audio data, and use audio data in the first channel of the first audio data as the first channel of audio data.

The terminal device provided in this embodiment of the present invention may execute the foregoing method embodiment. An implementation principle and a technical effect of the terminal device are similar to those of the method embodiment, and further details are not described herein.

Figure 15:
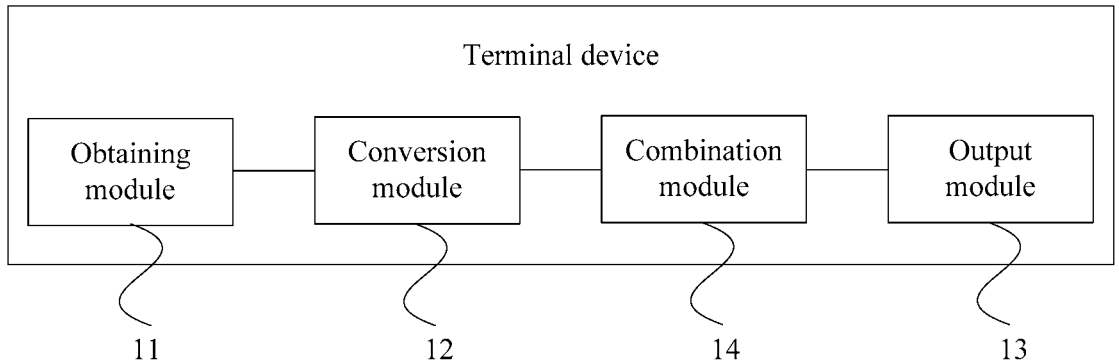
FIG. 15 is a schematic structural diagram of another terminal device according to an embodiment of the present invention.

FIG. 15 is a schematic structural diagram of another terminal device according to an embodiment of the present invention. As shown in FIG. 15, based on the block diagram shown in FIG. 14, the terminal device may further include a combination module 14.

The combination module 14 is configured to: before the output module 13 outputs the first channel of audio data to the first audio output device, and/or outputs the second channel of audio data to the second audio output device, combine the first audio data and the second audio data into third audio data, where the first channel of audio data is audio data in a first channel of the third audio data, and the second channel of audio data is audio data in a second channel of the third audio data.

In this implementation, the output module 13 may be specifically configured to perform path switching for the third audio data, to output the audio data in the first channel of the third audio data to the first audio output device and/or output the audio data in the second channel of the third audio data to the second audio output device.

The terminal device provided in this embodiment of the present invention may execute the foregoing method embodiment. An implementation principle and a technical effect of the terminal device are similar to those of the method embodiment, and further details are not described herein.

Optionally, in an implementation of the present invention, when the first audio output device is an earphone, and the second audio output device is a speaker, the output module 13 may be specifically configured to detect whether the earphone is in contact with a user's ear or cheek, and when the earphone is in contact with the user's ear or cheek, outputs the first channel of audio data to the earphone. Alternatively, the output module 13 may be specifically configured to: detect whether the earphone is in contact with a user's ear or cheek, and when the earphone is not in contact with the user's ear or cheek, output the second channel of audio data to the speaker.

The terminal device provided in this embodiment of the present invention may execute the foregoing method embodiment. An implementation principle and a technical effect of the terminal device are similar to those of the method embodiment, and further details are not described herein.

Figure 16:
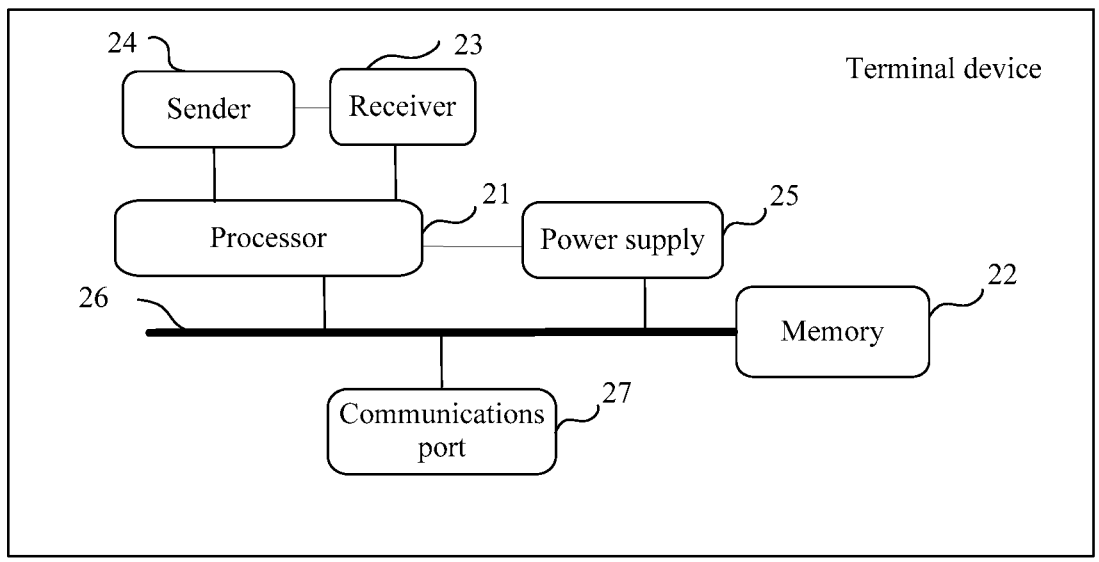
FIG. 16 is a schematic structural diagram of still another terminal device according to an embodiment of the present invention.

FIG. 16 is a schematic structural diagram of still another terminal device according to an embodiment of the present invention. In this embodiment, the terminal device is provided with a first audio output device and a second audio output device. As shown in FIG. 16, the terminal device may include a processor 21 (for example, a CPU) and a memory 22. The memory 22 may include a high-speed RAM memory, or may further include a nonvolatile memory NVM, for example, at least one magnetic disk storage. The memory 22 may store various instructions, for completing various processing functions and implementing the method steps of the embodiments. Optionally, the terminal device in this embodiment of the present invention may further include a receiver 23, a sender 24, a power supply 25, a communications bus 26, and a communications port 27. The receiver 23 and the sender 24 may be integrated into a transceiver of the terminal device, or may be a separate receive antenna and a separate transmit antenna of the terminal device. The communications bus 26 is configured to implement communication connection between components. The communications port 27 is configured to implement connection and communication between the terminal device and peripherals.

The processor 21 may call the instructions stored in the memory 22 to execute the audio data processing method provided in the foregoing embodiment of the present invention. An implementation principle and a technical effect thereof are similar to those of the audio data processing method, and further details are not described herein.

Figure 17:
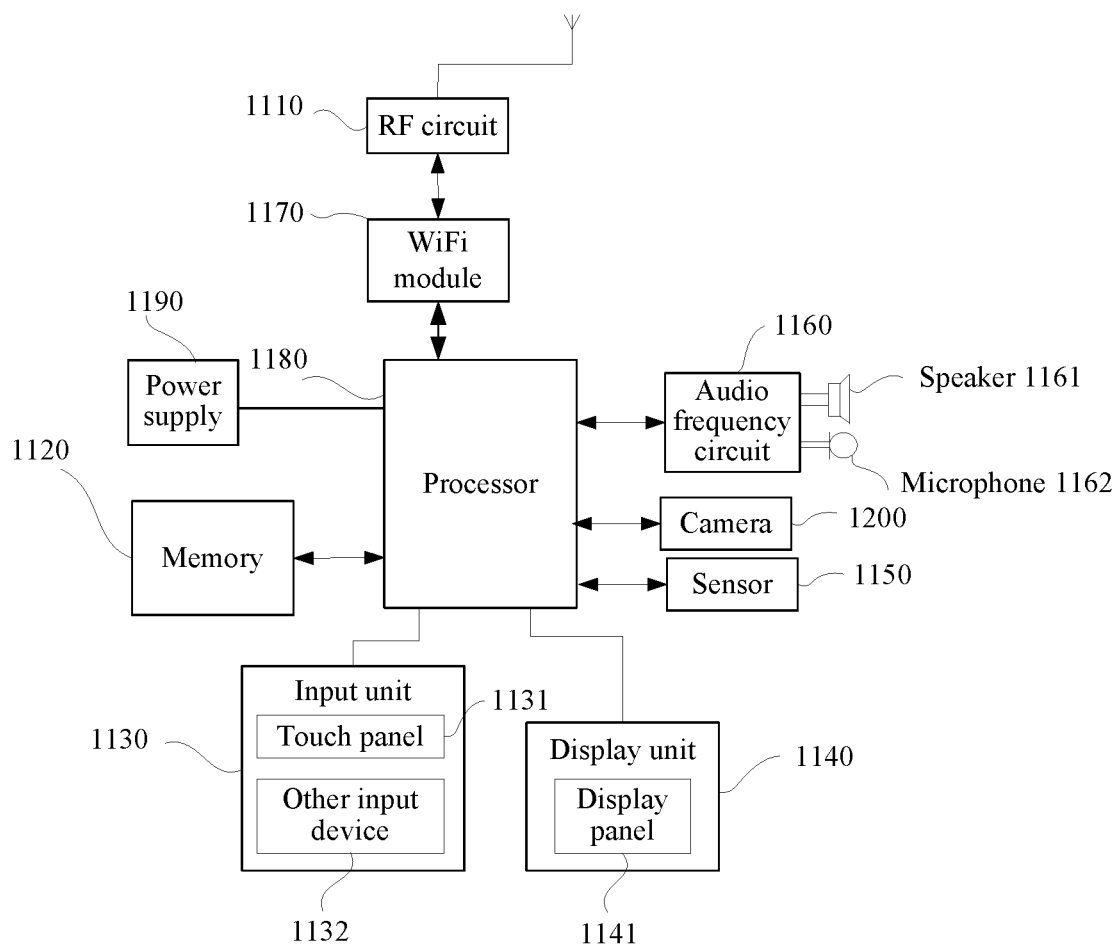
FIG. 17 is a structural block diagram of a mobile phone serving as a terminal device according to an embodiment of the present invention.

As described in the foregoing embodiments, the terminal device in the embodiments of the present invention may be a wireless terminal such as a mobile phone or a tablet computer. An example is used in which the terminal device is a mobile phone. FIG. 17 is a structural block diagram of a mobile phone serving as a terminal device according to an embodiment of the present invention. Referring to FIG. 17, the mobile phone may include: a radio frequency (Radio Frequency, RF) circuit 1110, a memory 1120, an input unit 1130, a display unit 1140, a sensor 1150, an audio frequency circuit 1160, a Wireless Fidelity (wireless fidelity, WiFi) module 1170, a processor 1180, a power supply 1190, and other components. Persons skilled in the art can understand that the mobile phone structure shown in FIG. 17 does not constitute any limitation on the mobile phone, and the mobile phone may include more or fewer components than those shown in the figure, or a combination of some components, or different arrangements of components.

Components of the mobile phone are described in detail below with reference to FIG. 17.

The RF circuit 1110 may be configured for reception and sending of signals in an information receiving/sending process or a call process; and in particular, after receiving downlink information of a base station, send the downlink information to the processor 1180 for processing, and send uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 1110 may further communicate with a network and other devices via radio communication. Any communications standard or protocol may be used for the radio communication, including but not limited to Global System for Mobile Communications (Global System for Mobile Communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, short message service (Short Messaging Service, SMS), and the like.

The memory 1120 may be configured to store software programs and modules. The processor 1180 executes various function applications and processes data of the mobile phone by running the software programs and modules stored in the memory 1120. The memory 1120 may mainly include a program storage area and a data storage area. The program storage area may store an operating system, an application program required for at least one function (such as a sound playback function and an image playback function), and the like. The data storage area may store data created based on use of the mobile phone (such as audio data and a phone book), and the like. In addition, the memory 1120 may include a high-speed random access memory, or may further include a nonvolatile memory such as at least one magnetic disk storage device, a flash memory device, or another volatile solid-state storage device.

The input unit 1130 may be configured to receive input digit or character information, and generate key signal input related to user setting and function control of the mobile phone. Specifically, the input unit 1130 may include a touch panel 1131 and other input devices 1132. The touch panel 1131 is also referred to as a touchscreen, and may collect a touch operation performed by a user on or near the touch panel 1131 (for example, an operation performed by the user on or near the touch panel 1131 by using a finger or any proper object or accessory such as a stylus), and drive a corresponding connection apparatus based on a preset program. Optionally, the touch panel 1131 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touchpoint coordinates, and sends the touchpoint coordinates to the processor 1180, and can receive and execute a command sent from the processor 1180. In addition, the touch panel 1131 may be implemented in a plurality of types, such as a resistive type, a capacitive type, an infrared type, and a surface acoustic wave type. In addition to the touch panel 1131, the input unit 1130 may include other input devices 1132. Specifically, the other input devices 1132 may include but are not limited to one or more of a physical keyboard, a function key (such as a volume control key or a power key), a trackball, a mouse, and a joystick.

The display unit 1140 may be configured to display information input by the user, information provided for the user, and various menus of the mobile phone. The display unit 1140 may include a display panel 1141. Optionally, the display panel 1141 may be configured in a form of, for example, a liquid crystal display (Liquid Crystal Display, LCD) or an organic light-emitting diode (Organic Light-Emitting Diode, OLED). Further, the touch panel 1131 may cover the display panel 1141. After detecting a touch operation on or near the touch panel 1131, the touch panel 1131 transfers the touch operation to the processor 1180 to determine a type of the touch event. Then, the processor 1180 provides corresponding visual output on the display panel 1141 based on the type of the touch event. Although in FIG. 17, the touch panel 1131 and the display panel 1141 are used as two separate components to implement input and output functions of the mobile phone, in some embodiments, the touch panel 1131 may be integrated with the display panel 1141 to implement the input and output functions of the mobile phone.

The mobile phone may further include at least one sensor 1150, for example, a proximity sensor, a motion sensor, or other sensors. Specifically, the proximity sensor may include an ambient proximity sensor and a proximity sensor. The ambient proximity sensor may adjust luminance of the display panel 1141 based on brightness of ambient light. The proximity sensor may turn off the display panel 1141 and/or backlight when the mobile phone is moved close to an ear. As a type of motion sensor, an acceleration sensor may detect values of acceleration in various directions (generally three axes), may detect, in a static state, a value and a direction of gravity, and may be used for applications that recognize mobile phone postures (for example, screen switching between a landscape mode and a portrait mode, a related game, and magnetometer posture calibration), functions related to vibration recognition (for example, a pedometer and tapping), and the like. Other sensors that can be configured on the mobile phone such as a gyroscope, a barometer, a hygrometer, a thermometer, and an infrared sensor are not further described herein.

The audio frequency circuit 1160, a speaker 1161, and a microphone 1162 may provide an audio interface between the user and the mobile phone. The audio frequency circuit 1160 may transmit, to the speaker 1161, an electrical signal that is obtained through conversion of received audio data, and the speaker 1161 converts the electrical signal into a sound signal and outputs the sound signal. In another aspect, the microphone 1162 converts a collected sound signal into an electrical signal; the audio frequency circuit 1160 receives the electrical signal and converts the electrical signal into audio data, and outputs the audio data to the processor 1180 for processing; and processed audio data is sent to, for example, another mobile phone by using the RF circuit 1110, or the audio data is output to the memory 1120 for further processing.

WiFi is a short-range wireless transmission technology. By using the WiFi module 1170, the mobile phone may help the user, for example, send/receive an email, browse a web page, and access streaming media. The WiFi module 1170 provides wireless broadband Internet access for the user. Although FIG. 17 shows the WiFi module 1170, it can be understood that the WiFi module 1170 is not a necessary constituent of the mobile phone and may be omitted as required provided that the essence of the present invention is not changed.

The processor 1180 is a control center of the mobile phone, and connects various parts of the entire mobile phone by using various interfaces and lines. The processor 1180 executes various functions of the mobile phone and processes data by running or executing the software programs and/or the modules stored in the memory 1120, and calling data stored in the memory 1120, so as to monitor the entire mobile phone. Optionally, the processor 1180 may include one or more processing units. Preferably, an application processor and a modem processor may be integrated into the processor 1180. The application processor mainly processes an operating system, a user interface, an application program, and the like. The modem processor mainly processes radio communication. It may be understood that the modem processor may alternatively not be integrated into the processor 1180.

The mobile phone further includes the power supply 1190 (for example, a battery) that powers the components. Preferably, the power supply may be logically connected to the processor 1180 by using a power management system, so as to implement functions such as charging management, discharging management, and power consumption management by using the power management system.

The mobile phone may further include a camera 1200. The camera may be a front-facing camera, or may be a rear-facing camera. Although not shown, the mobile phone may further include, for example, a Bluetooth module and a GPS module. Further details are not described herein.

In this embodiment of the present invention, based on a same inventive concept, a problem-resolving principle of the terminal device provided in this embodiment of the present invention is similar to that of the audio data processing method in the method embodiments of the present invention. The processor 1180 included in the mobile phone may be configured to execute the solutions of the audio data processing method of the present invention, and reference may be made to corresponding descriptions in FIG. 3 to FIG. 13. For an implementation principle and a technical effect of the processor 1180, refer to the implementation principle and the technical effect of audio data processing in the foregoing method implementations. Details are not described herein again.

The sequence numbers of the foregoing embodiments of the present invention are merely for illustrative purposes, and are not intended to indicate priorities of the embodiments.

Another aspect of the embodiments of the present invention further provides a storage medium. The storage medium may be a nonvolatile computer-readable storage medium. The nonvolatile computer-readable storage medium stores at least one program. Each program includes an instruction. When the instruction is executed by an electronic device provided with a processor, a transceiver, and an output device, the electronic device executes the solutions of the method of the present invention, including:

obtaining first audio data and second audio data; converting the first audio data into a first channel of audio data, and converting the second audio data into a second channel of audio data; and outputting the first channel of audio data to a first audio output device, and/or outputting the second channel of audio data to a second audio output device.

Optionally, when the first audio data is mono audio data, the converting the first audio data into a first channel of audio data includes: using the first audio data as the first channel of audio data.

Optionally, when the first audio data is multichannel audio data, the converting the first audio data into a first channel of audio data includes: using audio data in at least one channel of the first audio data as the first channel of audio data. For example, audio data in all channels of the first audio data is combined, to generate mono audio data of the first audio data, and the mono audio data of the first audio data is used as the first channel of audio data. Alternatively, audio data in channels other than a first channel is deleted from the first audio data, and audio data in the first channel of the first audio data is used as the first channel of audio data.

Optionally, before the outputting the first channel of audio data to a first audio output device, and/or outputting the second channel of audio data to a second audio output device, the method further includes: combining the first channel of audio data and the second channel of audio data into third audio data, where the first channel of audio data is audio data in a first channel of the third audio data, and the second channel of audio data is audio data in a second channel of the third audio data; and the outputting the first channel of audio data to a first audio output device, and/or outputting the second channel of audio data to a second audio output device includes: performing path switching for the third audio data, to output the audio data in the first channel of the third audio data to the first audio output device and/or output the audio data in the second channel of the third audio data to the second audio output device.

Optionally, the first audio output device is an earphone, and the second audio output device is a speaker. The outputting the first channel of audio data to the first audio output device includes: detecting whether the earphone is in contact with a user's ear or cheek; and if the earphone is in contact with the user's ear or cheek, outputting the first channel of audio data to the earphone.

Optionally, the first audio output device is an earphone, and the second audio output device is a speaker. The outputting the second channel of audio data to the second audio output device includes: detecting whether the earphone is in contact with a user's ear or cheek; and if the earphone is not in contact with the user's ear or cheek, outputting the second channel of audio data to the speaker.

Optionally, the first audio data is voice announcement audio data, and the second audio data is ringtone audio data.

Persons of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The terms used in the embodiments of the present invention are merely for the purpose of illustrating specific embodiments, and are not intended to limit the present invention. The terms "a", "the" and "this" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

What is claimed is:

1. An audio data processing method, applied to a terminal device provided with a first audio output device and a second audio output device, wherein the method comprises:

obtaining, by the terminal device, first audio data and second audio data;

converting, by the terminal device, the first audio data into a first channel of audio data, and converting the second audio data into a second channel of audio data;

combining, by the terminal device, the first channel of audio data and the second channel of audio data into third audio data, wherein the third audio data is one piece of audio data, wherein the first channel of audio data is audio data in a first channel of the third audio data, and the second channel of audio data is audio data in a second channel of the third audio data, wherein the third audio data further comprises at least one frame of audio data, wherein the at least one frame of audio data of the third audio data comprises a left channel of audio data and a right channel of audio data, wherein the audio data in the left channel of the at least one frame of audio data of the third audio data is the first channel of audio data, and audio data in the right channel of the at least one frame of audio data of the third audio data is the second channel of audio data, and wherein an audio chip of the terminal device that is able to receive only one piece of audio data is able to receive the first channel of audio data and the second channel of audio data simultaneously; and at least one of:
  outputting, by the terminal device, the first channel of audio data to the first audio output device, wherein the terminal device performs path switching for the third audio data by using the audio chip of the terminal device to output the first channel of audio data to the first audio output device, and wherein outputting the first channel of audio data to the first audio output device comprises outputting the audio data in the first channel of the third audio data to the first audio output device; or
  outputting, by the terminal device, the second channel of audio data to the second audio output device, wherein the terminal device performs path switching for the third audio data by using the audio chip of the terminal device to output the second channel of audio data to the second audio output device, and wherein outputting the second channel of audio data to the second audio output device comprises outputting the audio data in the second channel of the third audio data to the second audio output device.

2. The method of claim 1, wherein the first audio data is mono audio data, and wherein the converting, by the terminal device, the first audio data into a first channel of audio data comprises:
  using, by the terminal device, the first audio data as the first channel of audio data.

3. The method of claim 1, wherein the first audio data is multichannel audio data, and wherein the converting, by the terminal device, the first audio data into a first channel of audio data comprises:
  using, by the terminal device, audio data in at least one channel of the first audio data as the first channel of audio data.

4. The method of claim 3, wherein the using, by the terminal device, audio data in at least one channel of the first audio data as the first channel of audio data comprises:
  combining, by the terminal device, audio data in all channels of the first audio data to generate mono audio data of the first audio data; and
  using, by the terminal device, the mono audio data of the first audio data as the first channel of audio data.

5. The method of claim 3, wherein the using, by the terminal device, audio data in at least one channel of the first audio data as the first channel of audio data comprises:
  using audio data in a first channel of the first audio data as the first channel of audio data.

6. The method of claim 1, wherein the first audio output device is an earphone, and wherein the second audio output device is a speaker.

7. The method of claim 6, wherein the outputting, by the terminal device, the first channel of audio data to the first audio output device comprises:
  outputting, by the terminal device, the first channel of audio data to the earphone in response to a detection that the earphone is in contact with a user.

8. The method of claim 6, wherein the outputting, by the terminal device, the second channel of audio data to the second audio output device comprises:
  outputting, by the terminal device, the second channel of audio data to the speaker in response to a detection that the earphone is not in contact with a user.

9. The method of claim 1, wherein the first audio data is voice announcement audio data, and wherein the second audio data is ringtone audio data.

10. The method of claim 1, wherein before obtaining the first audio data and the second audio data, the method further comprises:
  receiving, by the terminal device, a notification message, wherein the obtained first audio data and the obtained second audio data correspond to the received notification message.

11. The method of claim 10, wherein the notification message includes an incoming call notification message, an instant messaging notification message, a short message service notification message, a system pushed notification message, or a third-party application pushed notification message.

12. A terminal device, wherein the terminal device is provided with a first audio output device and a second audio output device, and wherein the terminal device comprises at least one processor and at least one memory, the at least one memory comprising instructions that when executed by the at least one processor, cause the terminal device to perform, at least, the following:
  obtaining first audio data and second audio data;
  converting the first audio data into a first channel of audio data, and converting the second audio data into a second channel of audio data;
  combining the first channel of audio data and the second channel of audio data into third audio data, wherein the third audio data is one piece of audio data, wherein the first channel of audio data is audio data in a first channel of the third audio data, and the second channel of audio data is audio data in a second channel of the third audio data, wherein the third audio data further comprises at least one frame of audio data, wherein the at least one frame of audio data of the third audio data comprises a left channel of audio data and a right channel of audio data, wherein the audio data in the left channel of the at least one frame of audio data of the third audio data is the first channel of audio data, and audio data in the right channel of the at least one frame of audio data of the third audio data is the second channel of audio data, and wherein an audio chip of the terminal device that is able to receive only one piece of audio data is able to receive the first channel of audio data and the second channel of audio data simultaneously; and
  at least one of:
    outputting the first channel of audio data to the first audio output device, wherein the terminal device performs path switching for the third audio data by using the audio chip of the terminal device to output the first channel of audio data to the first audio output device, and wherein outputting the first channel of audio data to the first audio output device comprises outputting the audio data in the first channel of the third audio data to the first audio output device; or
    outputting the second channel of audio data to the second audio output device, wherein the terminal device performs path switching for the third audio data by using the audio chip of the terminal device to output the second channel of audio data to the second audio output device, and wherein outputting the second channel of audio data to the second audio output device comprises outputting the audio data in the second channel of the third audio data to the second audio output device.

13. The terminal device of claim 12, wherein the first audio data is mono audio data, and wherein the converting the first audio data into a first channel of audio data comprises:
    using the first audio data as the first channel of audio data.

14. The terminal device of claim 12, wherein the first audio data is multichannel audio data, and wherein the converting the first audio data into a first channel of audio data comprises:
    using audio data in at least one channel of the first audio data as the first channel of audio data.

15. The terminal device of claim 14, wherein the using audio data in at least one channel of the first audio data as the first channel of audio data comprises:
    combining audio data in all channels of the first audio data to generate mono audio data of the first audio data; and
    using the mono audio data of the first audio data as the first channel of audio data.

16. The terminal device of claim 14, wherein the using audio data in at least one channel of the first audio data as the first channel of audio data comprises:
    using audio data in a first channel of the first audio data as the first channel of audio data.

17. The terminal device of claim 12, wherein the first audio output device is an earphone, and wherein the second audio output device is a speaker.

18. The terminal device of claim 17, wherein the outputting the first channel of audio data to the first audio output device comprises:
    outputting the first channel of audio data to the earphone in response to a detection that the earphone is in contact with a user.

19. The terminal device of claim 17, wherein the outputting the second channel of audio data to the second audio output device comprises:
    outputting the second channel of audio data to the speaker in response to a detection that the earphone is not in contact with a user.

20. A non-transitory computer readable storage medium storing computer instructions, when executed by at least one processor of a terminal device, cause the at least one processor to:
    obtain first audio data and second audio data;
    convert the first audio data into a first channel of audio data, and convert the second audio data into a second channel of audio data;
    combine the first channel of audio data and the second channel of audio data into third audio data, wherein the third audio data is one piece of audio data, wherein the first channel of audio data is audio data in a first channel of the third audio data, and the second channel of audio data is audio data in a second channel of the third audio data, wherein the third audio data further comprises at least one frame of audio data, wherein the at least one frame of audio data of the third audio data comprises a left channel of audio data and a right channel of audio data, wherein the audio data in the left channel of the at least one frame of audio data of the third audio data is the first channel of audio data, and audio data in the right channel of the at least one frame of audio data of the third audio data is the second channel of audio data, and wherein an audio chip of the terminal device that is able to receive only one piece of audio data is able to receive the first channel of audio data and the second channel of audio data simultaneously; and
    at least one of:
        output the first channel of audio data to a first audio output device, wherein the terminal device performs path switching for the third audio data by using the audio chip of the terminal device to output the first channel of audio data to the first audio output device, and wherein outputting the first channel of audio data to the first audio output device comprises outputting the audio data in the first channel of the third audio data to the first audio output device; or
        output the second channel of audio data to a second audio output device, wherein the terminal device performs path switching for the third audio data by using the audio chip of the terminal device to output the second channel of audio data to the second audio output device, and wherein outputting the second channel of audio data to the second audio output device comprises outputting the audio data in the second channel of the third audio data to the second audio output device.

* * * * *